United States Patent [19]
Valbjorn et al.

[11] 4,141,497
[45] Feb. 27, 1979

[54] SENSING AND SETTING DEVICE FOR A REGULATOR ARRANGEMENT COMPRISING A PLURALITY OF THERMOSTATICALLY ACTUATED VALVES

[75] Inventors: Knud V. Valbjorn, Nordborg; Niels P. G. Graversen, Augustenborg, both of Denmark

[73] Assignee: Danfoss A/S, Nordborg, Denmark

[21] Appl. No.: 794,473

[22] Filed: May 6, 1977

[30] Foreign Application Priority Data

May 10, 1976 [DE] Fed. Rep. of Germany ....... 2620640

[51] Int. Cl.$^2$ ............................................. G05D 23/12
[52] U.S. Cl. ......................................... 236/51; 165/22; 236/42
[58] Field of Search ................. 236/51, 1 B, 98, 99 R, 236/42; 165/22; 337/310

[56] References Cited
U.S. PATENT DOCUMENTS

| | | | |
|---|---|---|---|
| 2,675,998 | 4/1954 | Reynolds | 236/51 UX |
| 2,718,573 | 9/1955 | Birk | 337/310 |
| 4,016,804 | 4/1977 | Turecek | 236/99 R |

*Primary Examiner*—William E. Wayner
*Attorney, Agent, or Firm*—Wayne B. Easton

[57] ABSTRACT

The invention relates to a thermostatic valve regulating system having a central control unit for operating two or more remotely located valve operating units. The valve operating units are for heat transfer equipment such as radiators. The valve operating units have expansible chamber elements and associated valve operating rods. The central control unit has an adjustable temperature response expansible chamber element -TRECE) with a vapor-liquid filling. The central control unit also has a transmitting expansible chamber element (TECE) which is connected to all of the expansible chamber elements of the valve operating units with capillary tubing. The capillary tubing and the connected expansible chamber elements are filled with a liquid transmitting element. The temperature responsive TRECE is in series relation to TECE and expansion and recession thereof cause an opposite recession or expansion of TECE. The expansion and recession of TECE is transmitted via the transmitting liquid to each of the expansible chamber elements of the remotely located valve operating units.

7 Claims, 4 Drawing Figures

SENSING AND SETTING DEVICE FOR A REGULATOR ARRANGEMENT COMPRISING A PLURALITY OF THERMOSTATICALLY ACTUATED VALVES

The invention relates to a sensing and setting device for a regulator arrangement comprising a plurality of thermostatically actuated valves which each have an operating element and a spring acting thereagainst and are controlled by the vapour pressure of a sensor having a liquid-vapour filling.

If a room has several heat exchanger units, e.g. hot water radiators, it is known to provide each unit with its own thermostatically actuated valve which has its own sensor and its own desired value setting device. However, such a regulator arrangement has the disadvantage that, upon a change in the desired value temperature of the room in question, the desired value springs of every individual valve must be adjusted. Since the adjustment is often not uniform, the heat exchanger units strive to produce different temperatures, this giving rise to undesirable longitudinal flow of the differently heated air within the room.

It is also already known to provide a common pneumatically or electrically operated setting device for a plurality of valves. However, this requires supplementary auxiliary energy.

The invention is based on the problem of providing a sensing and setting device for a regulator arrangement comprising a plurality of thermostatically actuated valves, which device is common to all valves but works without auxiliary energy.

This problem is solved according to the invention by a single sensor and by a converting device with a transmitter element which is under the influence of the vapour pressure of the sensor and of an adjustable desired value spring and which is connected to the operating elements of several valves by a transmission system filled with liquid.

By using only one sensor one obtains a simple construction. The vapour pressure of the sensor changes with an alteration in the temperature. This leads to a displacement of the transmitter element and thus to simultaneous adjustment of all connected valves. A similar effect is obtained when the common desired value spring is adjusted. Since the temperature is represented by the vapour pressure and the setting quantity by the liquid pressure and neither by a change in volume, the adjustment can have a uniform effect for all the valves. The valve settings are determined by an equilibrium of forces between the liquid pressure on the surface of the operating element and the counterforces caused by the springs associated with the individual valves or their operating elements. Also, it is immaterial how many operating elements are connected to the sensing and setting device; if, for example, four valves are connected instead of two, the transmitter element simply executes twice the stroke. Within certain limits, a single size will suffice to set the desired value of any number of valves simultaneously.

It is of particular advantage if the desired value setting spring is disposed in the vapour pressure chamber and acts in the same sense as the vapour pressure. This construction saves space.

In some cases it is then desirable to provide the sensing and setting device with a further spring which loads the transmitter element against the vapour pressure. This can ensure that an operating element is not overloaded when the associated spring force is removed, e.g. during assembly or during a repair.

In another embodiment, it is ensured that the desired value setting spring is disposed in the transmitter element and acts against the vapour pressure. This again saves space, the desired value setting spring simultaneously assuming the function of the overload protecting spring.

Further simplification is obtained if the transmitter element is surrounded by a vapour pressure chamber which is partially filled with liquid and simultaneously serves as sensor. An additional sensing element can then be dispensed with.

In a preferred embodiment, it is ensured that the transmitter element comprises corrugated tubular bellows which are mounted on a wall fixed with respect to the housing and comprise a movable base, that a housing cup connected to the wall fixed with respect to the housing engages over the corrugated tubular bellows to form the vapour pressure chamber, and that the desired value setting spring extends between the movable base and a supporting plate which is supported by a setting device surrounded by sealing bellows. This results in a transmitter element having a comparatively large volume and a comparatively large change in volume.

An alternative embodiment is characterised in that the movable base and the supporting plate in the vapour pressure chamber each have an external flange, a substantially axially extending connecting section and a central portion offset in relation to the wall fixed with respect to the housing, the desired value setting spring is provided between the external flange of the supporting plate and the central portion of the movable base, the sealing bellows are provided between the end wall of the housing cup and the central portion of the supporting plate, and a rotary knob is provided comprising a peripheral wall engaging over the housing cup, and end wall and, projecting inwardly therefrom up to the central portion of the supporting plate, a central screw-threaded connector held in a screw-threaded sleeve which projects inwardly from the end wall of the housing cup.

In another alternative construction, it is advantageous if the supporting plate in the transmitter element has an external flange, a substantially axially extending connecting section and a central portion offset in relation to the movable base, the desired value setting spring extends between the external flange of the supporting plate and the movable base, the sealing bellows extend between the central portion of the supporting plate and the wall fixed with respect to the housing, and a rotary knob is provided comprising an end wall and a peripheral wall which engages over the housing cup and has an internal screwthread in which there engages a screw plate carrying a pressure pin of the setting device and secured against rotation.

If the apparatus simultaneously serves as sensor, the rotary knob should have air apertures.

The invention will now be described in more detail with reference to the example illustrated in the drawing, wherein.

Figure 1:
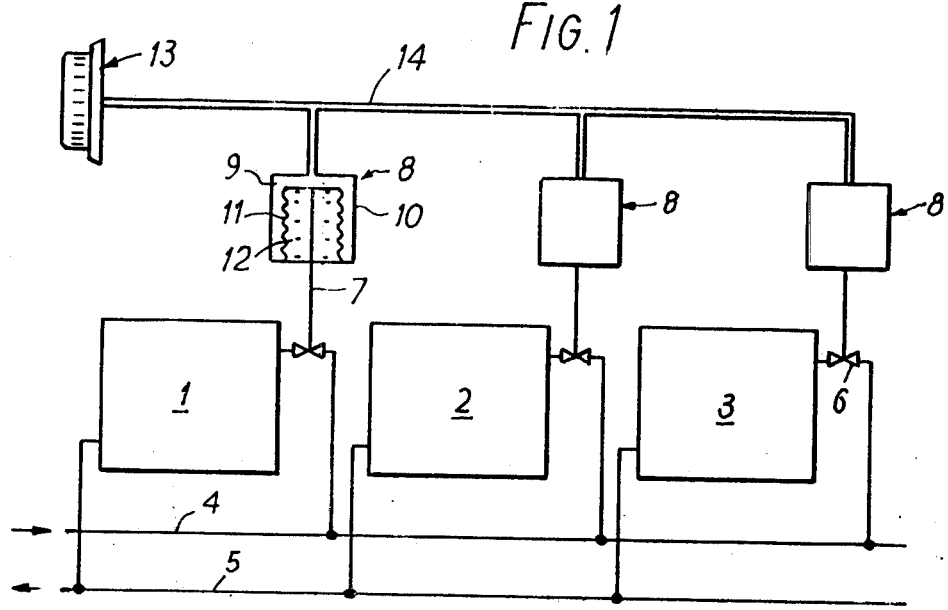
FIG. 1 is a diagrammatic representation of the entire regulator arrangement.

In accordance with FIG. 1, a room contains several radiators 1, 2 and 3 connected to a hot water supply conduit 4 and a return conduit 5. The connection to the supply conduit is in each case by a valve 6 of which the valve shank 7 comprises an actuating attachment 8. The latter comprises an operating element 9 bounded by an external pot 10 and corrugated tubular bellows 11, and a spring 12 supported at the base of the corrugated tubular bellows and a flange that is fixed with respect to the housing. The valves 6 and the associated operating elements 8 of all three radiators are of identical construction. They are connected to each other and to a sensing and setting device 13 by capillary tubes 14. The sensing and setting device is for example intended for mounting on a wall.

The construction of this sensing and setting device 13 will now be described in connection with FIGS. 2 and 3. A housing cup 16 having a screw-threaded sleeve 18 in the middle of its base 17 is secured to a square wall 15 which is fixed with respect to the housing and also serves as a mounting. Screwed into this sleeve there is a screw-threaded connector 19 projecting from the end wall 20 of a rotary knob 21, the end wall having a peripheral wall 22 which surrounds the housing cup and has air slots 23. Corrugated tubular bellows 24 are connected by one end to the wall 15 fixed with respect to the housing and at the other end to a movable base 25 having an external flange 26, an axially extending connecting section 27 and a central portion 28. A spring 29 with predetermined fixed pretensioning extends between the wall 1 fixed with respect to the housing and the external flange 26. An adjustable desired value spring extends between the central portion 28 of the movable base 25 and the external flange 31 of a supporting plate 32 which likewise comprises an axial connecting section 33 and a central portion 34. This central portion is supported on the end face of the screw-threaded connector 19. Sealing bellows 35 are connected by one end to this central portion 34 and by the other end to the base 17 of the housing cup.

The capillary tube 14 opens into a transmitter element 36 which is bounded by the corrugated tube 24, the movable base 25 and the wall 15 fixed with respect to the housing and, together with the capillary tubes and the operating elements 9 of the valves 6, forms a closed system filled with liquid. A vapour pressure chamber 37 is bounded by the corrugated tube 24, the movable base 25, and sealing bellows 35, the housing cup 16 and the wall 15 fixed with respect to the housing. This chamber is filled with a small amount of vaporisable liquid which is heated by the air supplied through the slots 23 by way of the housing cup 16 which is of metal; consequently a pressure corresponding to the temperature is produced in the vapour pressure chamber 37.

Accordingly, the movable base 25 assumes a position of equilibrium which depends not only on the vapour pressure and the force difference of the springs 29 and 30 but which is also affected by the liquid pressure which obtains in the transmission system and which is caused by the compressed springs 12 in the individual attachments 8. If, now, the temperature and thus the vapour pressure drop, the base 25 moves to the left in FIG. 3 primarily under the influence of the springs 12 until a new condition of equilibrium has been reached in which the springs 12 have expanded. This causes all valves to be opened further by an equal amount. Similar conditions apply when the rotary knob 21 is turned for the purpose of setting the desired value because in this case the force of the desired value spring 30 is changed instead of the vapour pressure. This operating mechanism is independent of the number of operating elements 9 that is connected. This is because the positions of equilibrium are substantially dependent on pressure but not on volume. When connecting a larger number of operating elements 9, a longer stroke for the movable base 25 is obtained with a given temperature difference.

To set the desired value, the rotary knob 21 has a pointer 38. A scale 39 with graduations 40 is mounted on the wall 15 that is fixed with respect to the housing.

The central portions 28 and 34 of the base 25 and the supporting plate 32 that are axially offset in relation to the external flanges 26 and 31 not only have the advantage of keeping the entire device axially short. They also serve as limiting abutments or counterbearings preventing an excessive stroke of the base 25, so that the corrugated tubular bellows of the operating elements 9 cannot be overloaded.

Figure 2:
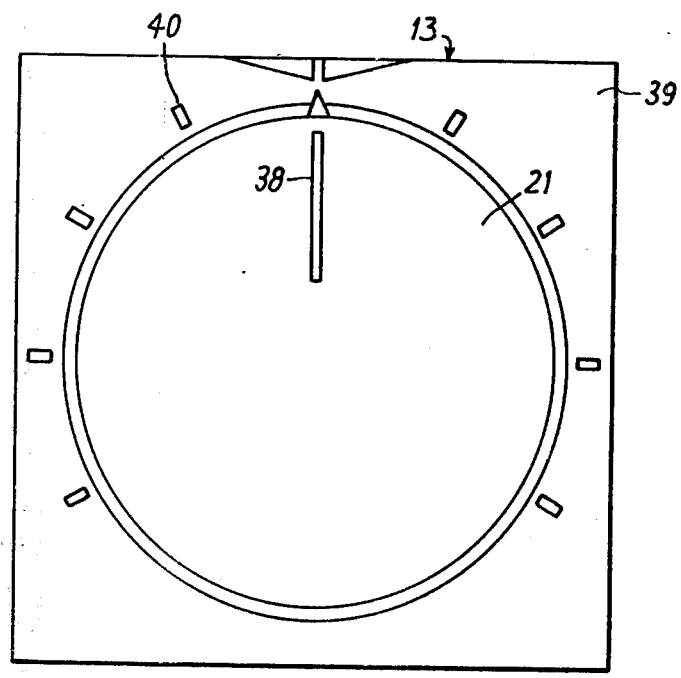
FIG. 2 is a front elevation of a sensing and setting device according to the invention.
Figure 3:
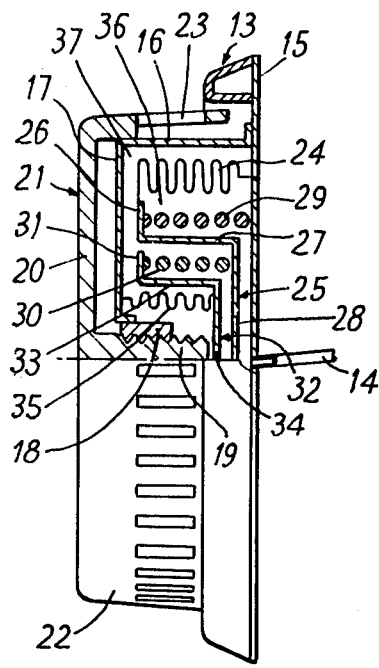
FIG. 3 is a part-sectional side elevation of the FIG. 2 device.
Figure 4:
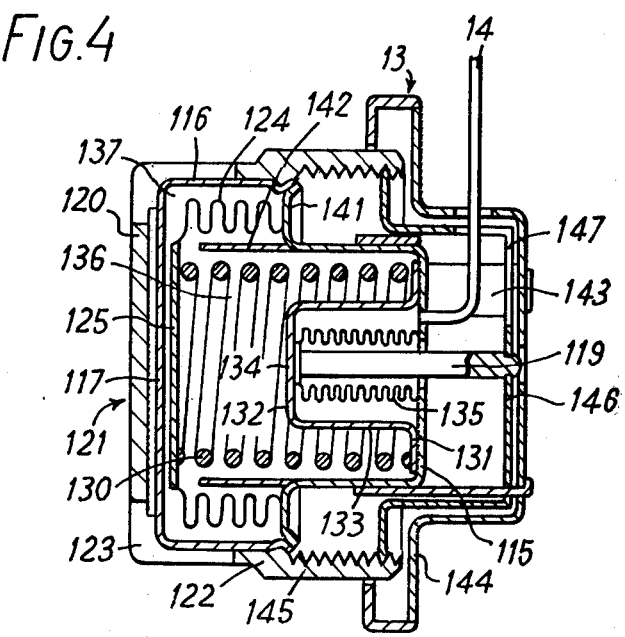
FIG. 4 is a section through another embodiment of a sensing and setting device according to the invention.

In the second embodiment illustrated in FIG. 4, the same references are used for corresponding parts as in FIGS. 2 and 3 but increased by 100. In this construction only a single spring 130 is used which serves as a desired value setting spring as well as an overload protecting spring. It is disposed in the transmitter element 136 together with the supporting plate 132. Whereas the supporting plate 132 has an external flange 131, an axial section 133 and a central portion 134, the movable base 125 is plane. The wall 115 fixed with respect to the housing is cup-shaped and comprises an external flange 141 to which the corrugated tubular bellows 124 are secured. An internally arranged cylinder 144 limits the path of the movable base 125. This wall fixed with respect to the housing is connected to an outer housing 144 by means of struts 143. The rotary knob 121 has an internal screwthread 145 at its peripheral wall 122 in which there is engaged a screw plate 146 which carries a pressure pin 119 of the setting device. The screw plate is cup-shaped and comprises three recesses for the passage of the six struts 143 and a slot 147 for building in the capillary tube 14. The screw plate is held against rotation by means of the struts 143. This means that, on rotation of the knob 121, it is axially displaced and thus the supporting plate 142 is axially adjusted to adjust the desired value setting spring 130.

If necessary, the vapour pressure chamber 37 can also be connected by means of a capillary tube to a separately arranged sensor.

We claim:

1. A thermostatic valve regulating system, comprising at least two valve operating units each having an expansible chamber element, said valve operating units each having valve operating rod means movably responsive in opening and closing directions to the expansion and recession of said expansible chamber elements, a thermostatic regulator having a casing, said regulator having a transmitting expansible chamber element (TECE) and a temperature responsive expansible chamber element (TRECE), first and second expansible capillary tube means between said TECE and each of said operating unit expansible chamber elements, a transmitting liquid in said capillary tube means and said expansible chamber elements connected thereto, a liquid-vapor filling in said TRECE, said TECE having one end fixed relative to said casing and a free end, said TRECE having one end in adjustably fixed relation to said casing and a free end in common with and in series transmitting relation to said free end of said TECE.

2. A system according to claim 1 wherein said operating unit expansible chamber elements have spring means biasing said rod means in said opening directions.

3. A system according to claim 1 including range setting spring means biasing said TRECE in an expanding direction.

4. A system according to claim 3 wherein said range setting spring means is interiorly of said TRECE.

5. A system according to claim 4 including spring means biasing said TECE in an expanding direction.

6. A system according to claim 1 wherein said TRECE is in surrounding relation to said TECE.

7. A system according to claim 6 wherein said TRECE and said TECE include corrugated tubular bellows.

* * * * *